Nov. 27, 1962 G. H. MENHENNETT 3,066,267
RADIAL RESONANT CAVITIES
Filed Sept. 3, 1958 2 Sheets-Sheet 1

Inventor
GERALD H. MENHENNETT
By Alfred C. Hill
Agent

Nov. 27, 1962 G. H. MENHENNETT 3,066,267
RADIAL RESONANT CAVITIES
Filed Sept. 3, 1958 2 Sheets-Sheet 2

Inventor
GERALD H. MENHENNETT
By Alfred C. Hill
Agent

United States Patent Office
3,066,267
Patented Nov. 27, 1962

3,066,267
RADIAL RESONANT CAVITIES
Gerald H. Menhennett, Red Bank, N.J., assignor to International Telephone and Telegraph Corporation, Nutley, N.J., a corporation of Maryland
Filed Sept. 3, 1958, Ser. No. 758,821
16 Claims. (Cl. 333—83)

This invention relates to radial resonant cavities and more particularly to tuning and coupling arrangements for radial resonant cavities.

It is known that the same size radial cavity can be tuned by the same tuning device through two separate spaced frequency ranges. The cavity may be tuned through the lower of the two frequency ranges if the cavity is excited in the $TM_{010}$ mode, and the cavity may be tuned through the higher of the two frequency ranges if the cavity is excited in the $TM_{110}$ mode. It is further known that these same results can be achieved by optimizing the cavity coupling mechanisms of the cavity for operation in the $TM_{110}$ mode which will result in the cavity supporting the $TM_{010}$ mode with sufficient power to enable the tuning of the cavity when energy is coupled from the $TM_{010}$ mode as well as the $TM_{110}$ mode.

It is an observed fact that the two frequency ranges obtainable by the arrangement briefly outlined above are separated by a frequency range over which the cavity cannot be tuned. This range can be termed the "transition range." Thus, if it were desired to cover the entire frequency band encompassing the two frequency ranges, it would be necessary to employ two cavities, one designed to cover the lower segment of the frequency band and the other particularly designed to cover the upper segment of the frequency band.

Therefore, an object of this invention is the provision of a tuning arrangement which will enable the employment of a single radial resonant cavity to cover the entire frequency band encompassing the two frequency ranges of the prior art device outlined above.

Another object of this invention is the provision of a tuning arrangement that will enable the tuning of a radial resonant cavity through the "transition region."

A problem also exists in radial resonant cavities in the transferring of maximum energy from the cavity over an extended frequency range without appreciably detuning the cavity. Heretofore inductive coupling loops have been employed to transfer energy from the cavity but this has resulted in detuning due to the inductance it induces into the cavity.

Therefore, still another object of this invention is the provision of a signal coupling arrangement which will provide the maximum transfer of energy from a radial resonant cavity over an extended frequency range with negligible detuning of the cavity over the extended coupling range.

A feature of this invention is to provide means for tuning a radial resonant cavity through a given frequency range and an additional means for varying the effective electrical size of said cavity to extend the frequency range through which said cavity can be tuned.

Another feature of this invention is to provide a signal coupling means comprising a member having first and second portions at right angles to each other, said first portion pivotably engaging the signal terminal and said second portion slidably engaging an end wall of said radial cavity, said first portion being spaced from said end wall a predetermined amount to introduce a capacitive reactance to counteract the inductive reactance of said member to substantially eliminate detuning of the cavity by said member and means to rotate said member to control the degree of signal coupling between the cavity and the signal terminal.

The above-mentioned and other features and objects of this invention will become more apparent by reference to the following description taken in conjunction with the accompanying drawings, in which.

Figure 1:
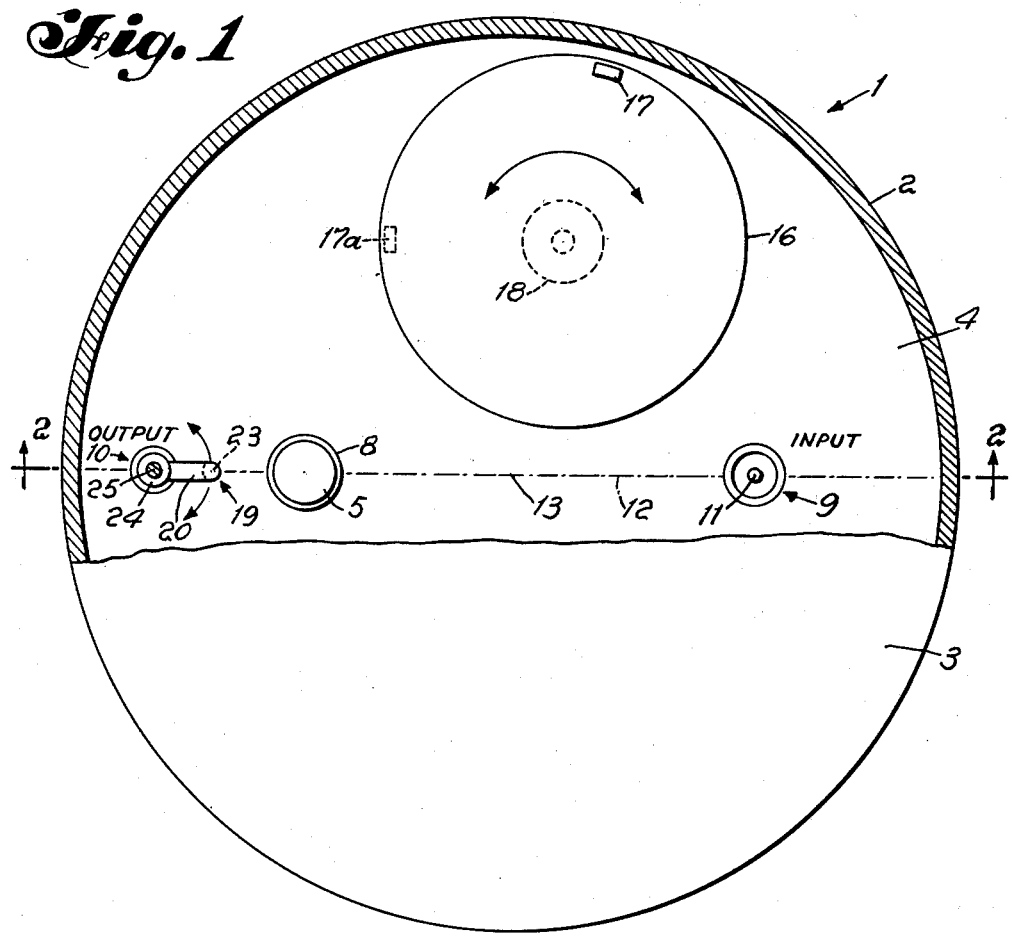
FIG. 1 is a plan view of a cylindrical radial resonant cavity with the enclosing end wall partially broken away illustrating an embodiment of the tuning arrangement and signal coupling arrangement following the principles of this invention.
Figure 2:
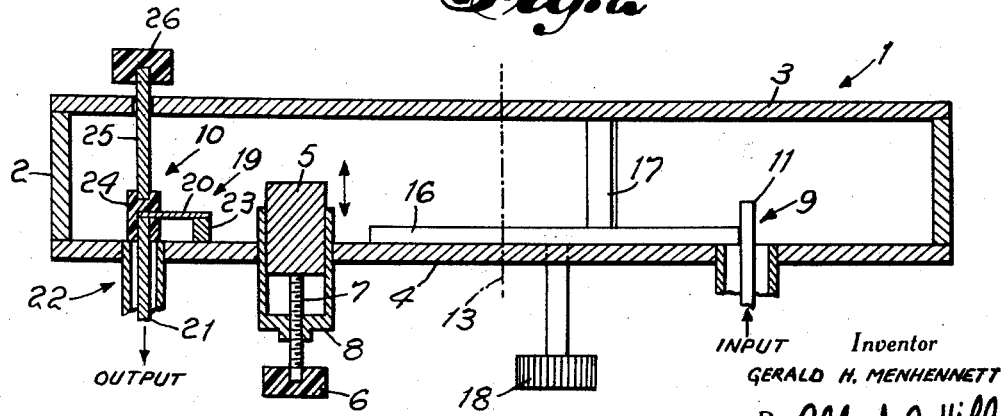
FIG. 2 is a cross-sectional view taken along line 2—2 of FIG. 1.

Referring to FIGS. 1 and 2, a radial resonant cavity 1 in accordance with the principles of this invention is illustrated as comprising a cylindrical side wall 2 and enclosing end walls 3 and 4. As discussed hereinabove, cavity 1 is capable of being tuned through two frequency ranges separated in frequency by approximately 15 percent of the frequency band encompassing the two frequency ranges. If cavity 1 is operated in the $TM_{010}$ mode, tuning condenser 5 will enable the tuning of cavity 1 through the lower of the two frequency ranges. If cavity 1 is operated in the $TM_{110}$ mode, tuning condenser 5 will enable the tuning of cavity 1 through the higher of the two frequency ranges. Tuning condenser 5 is operated to tune cavity 1 by means of the arrangement illustrated particularly in FIG. 2 which includes knob 6 and a threaded shaft 7 engaging the threaded portion of member 8. The penetration into cavity 1 by tuning condenser 5 enables the tuning of cavity 1 in either mode of operation. Practically it has been found advantageous to optimize the coupling mechanism of the signal input and output coupling arrangements 9 and 10 for operation of cavity 1 in the $TM_{110}$ mode. As illustrated, input coupling arrangement 9 includes a probe 11. It should be pointed out that probe 11 can be replaced by a tube element, plate or cathode of an electron discharge device. With this condition present it has been found that there is also present in cavity 1 the $TM_{010}$ mode with sufficient power to operate cavity 1 in this mode if signal output coupling arrangement 10 is properly adjusted to extract power from the cavity 1 when operation in the $TM_{010}$ mode is desired. Thus, cavity 1 may be operated in either mode with the resultant advantageous tuning of cavity 1 through the two separated frequency ranges.

To operate cavity 1 as described above, tuning condenser 5 and coupling arrangements 9 and 10 must be positioned in certain relatively critical regions of the electric fields present in the cavity when operating in the two different modes. First, these components must be located along a diameter of cavity 1 as represented by broken line 12 in FIG. 1. Second, input arrangement 9 must be located in a region of reasonably high impedance in both the $TM_{010}$ and $TM_{110}$ modes where energy in either mode may be efficiently transferred to cavity 1. Third, output arrangement 10 must be located in a region of reasonably low impedance in both the $TM_{010}$ and $TM_{110}$ modes where energy in either mode may be efficiently removed from cavity 1. Fourth, tuning condenser 5 should be located adjacent the output arrangement 10 in a region of relatively high impedance to provide efficient and desired tuning in both modes of operation of cavity 1. An observation of the electric field of the two modes of operation of cavity 1 illustrates that the high impedance regions and the low impedance regions of the two modes occur at substantially the same physical locations in cavity 1. It should be observed that to meet these requirements set forth hereinabove, coupling arrangements 9 and 10 and tuning condenser 5 are nonsymmetrically located with respect to the central axis of cavity 1 identified in FIG. 1 by the dot labelled 13 and in FIG. 2 by the broken line labelled 13.

Figure 3:
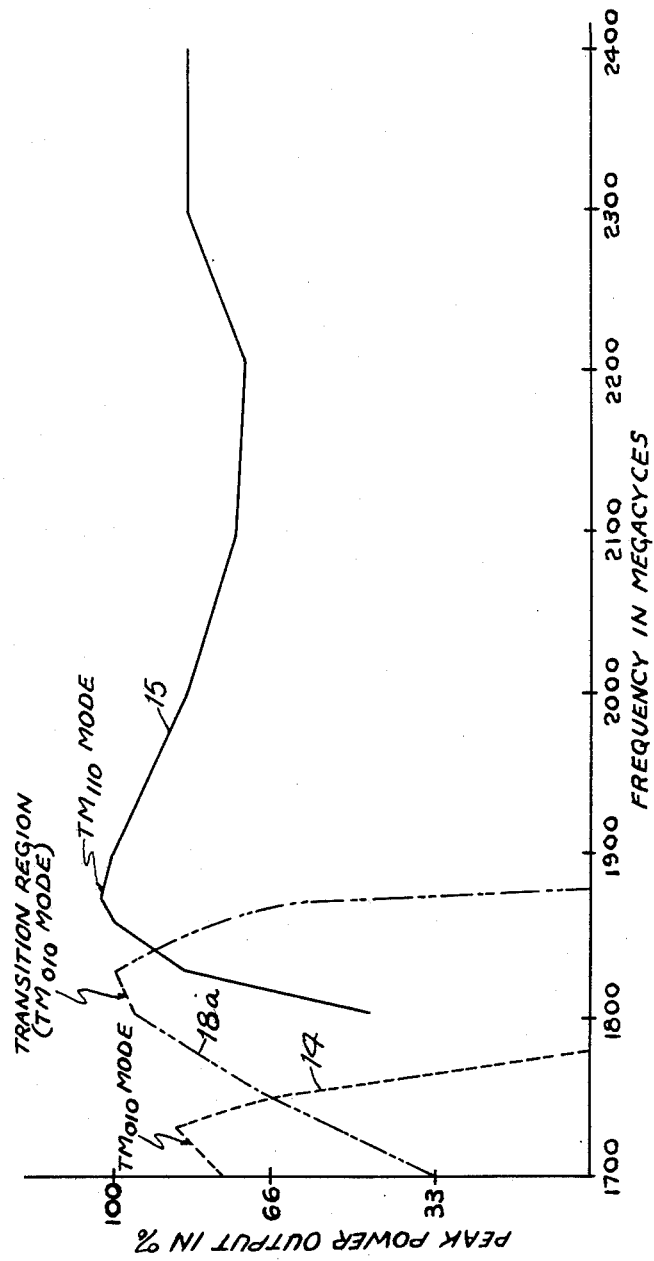
FIG. 3 is a graphical representation of the tuning range for a reduction to practice of a radial resonant cavity employing the tuning arrangement of FIGS. 1 and 2.

Employing the coupling and tuning arrangements hereinabove described in a reduction to practice wherein cavity 1 was 4½ inches in diameter and had a depth of ⅜ inch, cavity 1 was tuned through the two frequency ranges and measurements taken to provide a graphical representation of the tuning range of cavity 1, said graphical representation being illustrated in FIG. 3. When cavity 1 was operated in the $TM_{010}$ mode, it was possible to tune cavity 1 through the frequency range 1700 to 1780 megacycles as represented by the broken line curve 14. When cavity 1 was operated in the $TM_{110}$ mode, it was possible to tune the cavity through the frequency range 1800 to 2400 megacycles as illustrated by the solid curve 15.

Observing curves 14 and 15 of FIG. 3, it will be noted that the two tuning ranges are separated by a third frequency range through which cavity 1 cannot be tuned, and as hereinabove termed, this frequency range is the "transition range" of cavity 1. This "transition range" is believed to result from the shifting of the electromagnetic field within the cavity in such a manner that input coupling arrangement 9 is electrically located at a low impedance point and as a result cannot deliver power to the cavity. The tuning condenser 5 also becomes ineffective when the electromagnetic field shifts since capacitor 5 is located in a null or extremely low impedance point.

In accordance with the principles of the present invention, it is possible to tune cavity 1 through this "transition region" by inserting in cavity 1 a means for varying the effective electrical size of the cavity to extend the frequency range through which cavity 1 may be tuned when cavity 1 is operating in the $TM_{010}$ mode. This means to vary the effective electrical size of cavity 1 is illustrated in FIGS. 1 and 2 as including a disc 16 in electrically coupled but sliding relation with end wall 4. Disposed on the periphery of disc 16 is a shorting member 17 which extends from disc 16 to end wall 3 parallel with central axis 13. Shorting member 17 electrically shorts end walls 3 and 4. Disc 16 may be rotated and hence the position of shorting member 17 may be changed relative to the central axis 13 of cavity 1 by means of knob 18. To tune cavity 1 through the "transition region" with cavity 1 operating in the $TM_{010}$ mode, member 17 is moved from side wall 2 where it has no appreciable effect to a predetermined position in cavity 1 toward the central axis 13. This position is illustrated by the dotted representation of member 17 and labelled 17a. As the member 17 is moved from the outside wall toward the central axis 13 of cavity 1, the resonant frequency of the cavity is increased. Cavity 1 may be tuned through the "transition region" by means of shorting member 17 alone being moved to predetermined locations from the outside wall 2 toward central axis 3 or cavity 1 may be tuned through the "transition region" by setting member 17 in a predetermined location toward central axis 13 and then manipulate tuning condenser 5, or cavity 1 may be tuned through this "transition region" by the cooperative manipulation of shorting member 17 and tuning condenser 15.

The action of shorting member 17 is to effectively decrease the effective electrical size of cavity 1 and hence cause cavity 1 to respond for tuning purposes to higher frequencies. It may be further stated that by reducing the effective electrical size of cavity 1 by means of shorting member 17, the electromagnetic field is reshifted in cavity 1 to maintain input coupling arrangement 9 and the tuning capacitor at relatively high impedance points. Curve 18a represents the tuning of cavity 1 through the "transition region" by member 17 which action effectively extends the frequency range over which cavity 1 may be tuned in the $TM_{010}$ mode. It should be further pointed out that member 17 will extend the higher end of the frequency range of cavity 1 when operating in the $TM_{110}$ mode.

It has been further found in the operation of cavity 1 with the present improvement of radial resonant cavities or in other types of resonant circuits that an inductive loop as illustrated at 11 in input coupling arrangement 9 introduces inductance into the cavity which results in detuning of the cavity particularly wherein it is desired to accomplish a maximum transfer of energy over the tuning range of the cavity. It has been found that this undesired tuning effect can be overcome by employing the coupling arrangement illustrated in detail in connection with output coupling arrangement 11. The coupling arrangement 11 includes a member 19 having a first portion 20, one end of which pivotably engages the center conductor 21 of coaxial line 22. Member 18 further includes a second portion 23 disposed at the other end of portion 20 and in slidable engagement with the end wall 4 to provide a slidable electrical contact between wall 4 and portion 23. Portion 20 and center conductor 21 are enclosed in a dielectric sleeve 24 which is free to turn on center conductor 21 such that portion 20 is pivotably engaged with the end of center conductor 21 at all times when member 19 is rotated to adjust the degree of coupling by means of shaft 25 and knob 26. Member 19 provides between portion 20 and end wall 4 distributed capacity which will counteract inductance which member 19 might have introduced into the cavity with its resultant detuning. In effect member 19 is a short-circuited transmission line and hence by the variation of the physical dimensions of portion 20, that is, the width of member 20 and its spacing from end wall 4, it is possible to provide member 19 with any desired characteristic impedance. It should be further pointed out that member 19 can be made longer than heretofore possible with known inductive loops to provide a greater degree of coupling and a greater range in the degree of coupling.

While I have described above the principles of my invention in connection with specific apparatus, it is to be clearly understood that this description is made only by way of example and not as a limitation to the scope of my invention as set forth in the objects thereof and in the accompanying claims.

I claim:
1. In a radial resonant cavity, means for tuning said cavity through a given frequency range and a shorting member disposed in said cavity mounted for eccentric movement therein relative to the central axis of said cavity to extend the frequency range through which said cavity can be tuned.
2. In a radial resonant cavity having a cylindrical side wall and enclosing end walls, means for tuning said cavity through a given frequency range, a shorting member extending between said end walls, and means to move said shorting member eccentrically relative to the central axis of said cavity to extend the frequency range through which said tuning means can tune said cavity.
3. In a radial resonant cavity, means for tuning said cavity through a given frequency range and a shorting member disposed in said cavity mounted for movement in a circle to extend the frequency range through which said cavity can be tuned.
4. In a radial resonant cavity, means for tuning said cavity through a given frequency range and a shorting member disposed in said cavity mounted for movement in a circle to extend the frequency range through which said tuning means can tune said cavity.
5. In a radial resonant cavity, means for tuning said cavity through a given frequency range and a shorting member disposed in said cavity mounted for movement in a circle to extend the frequency range through which said cavity can be tuned, the center of said circle being spaced from the central axis of said cavity.

6. In a radial resonant cavity, means for tuning said cavity through a given frequency range and a shorting member disposed in said cavity mounted for movement in a circle to extend the frequency range through which said tuning means can tune said cavity, the center of said circle being spaced from the central axis of said cavity.

7. In a radial resonant cavity having a cylindrical side wall and enclosing end walls, means for tuning said cavity through a given frequency range, a disc disposed in electrical sliding contact with one of said end walls, the center of said disc being spaced from the central axis of said cavity, a shorting member mounted on said disc and in electrical sliding contact with the other of said end walls and means to rotate said disc about its center to move said member to extend the frequency range through which said cavity can be tuned.

8. In a radial resonant cavity having a cylindrical side wall and enclosing end walls, means for tuning said cavity through a given frequency range, a disc disposed in electrical sliding contact with one of said end walls, the center of said disc being spaced from the central axis of said cavity, a shorting member mounted on the periphery of said disc and in electrical sliding contact with the other of said end walls and means to rotate said disc about its center to move said member to extend the frequency range through which said cavity can be tuned.

9. In a radial resonant cavity having a cylindrical side wall and enclosing end walls capable of being excited in first and second modes, a tuning arrangement comprising means to tune said cavity through a first frequency range when said cavity is operating in said first mode and a second frequency range when said cavity is operating in said second mode, said first and second frequency ranges being separated by a third frequency range, shorting means disposed parallel to and spaced from the central axis of said cavity, and means to move said shorting means eccentrically relative to said central axis to reduce the effective electrical size of said cavity progressively to tune said cavity through said third frequency range.

10. In a radial resonant cavity having a cylindrical side wall and enclosing end walls capable of being excited in first and second modes, a tuning arrangement comprising means to tune said cavity through a first frequency range when said cavity is operating in said first mode and a second frequency range when said cavity is operating in said second mode, said first and second frequency ranges being separated by a third frequency range, a member disposed between said end walls in an electrical shorting relationship therewith, and means to move said member eccentrically relative to the central axis of said cavity from said side wall toward the center of said cavity to tune said cavity through said third frequency range.

11. In a radial resonant cavity having a cylindrical side wall and enclosing end walls, means for tuning said cavity through a given frequency range and means for extending the frequency range through which said cavity can be tuned and a signal coupling arrangement including input signal coupling means and output signal coupling means, at least one of said signal coupling means comprising a signal terminal disposed in one of said end walls, and a member having first and second portions at right angles to each other, said first portion engaging said terminal and said second portion engaging said one of said end walls, said first portion being spaced from said one of said end walls a predetermined amount to introduce a capacitive reactance to counteract the inductance reactance of said member to thereby substantially eliminate detuning of said cavity by said member over said extended frequency range.

12. In a radial resonant cavity having a cylindrical side wall and enclosing end walls, means for tuning said cavity through a given frequency range and means for extending the frequency range through which said cavity can be tuned and a signal coupling arrangement including input signal coupling means and output signal coupling means, at least one of said signal coupling means comprising a signal terminal disposed in one of said end walls, a member having first and second portions at right angles to each other, said first portion pivotably engaging said terminal and said second portion slidably engaging said one of said end walls, said first portion being spaced from said one of said end walls a predetermined amount to introduce a capacitive reactance to counteract the inductive reactance of said member to thereby substantially eliminate detuning of said cavity by said member over said extended frequency range, and means rotating said member to control the degree of signal coupling between said cavity and said terminal.

13. In a radial resonant cavity having a cylindrical side wall and enclosing end walls capable of being excited in first and second modes, a tuning arrangement comprising means to tune said cavity through a first frequency range when said cavity is operating in said first mode and a second frequency range when said cavity is operating in said second mode, said first and second frequency ranges being separated by a third frequency range, a member disposed between said end walls in an electrical shorting relationship therewith, and means to move said member from said side wall toward the center of said cavity to tune said cavity through said third frequency range, and a signal coupling arrangement comprising a terminal disposed perpendicular to one of said end walls, a first member in electrical coupling relation to said terminal disposed parallel to said one of said end walls, a second member disposed adjacent the end of said first member removed from said terminal and in an electrical shorting relationship with said one of said end walls and said first member, and means to rotate said first and second members to control the degree of signal coupling between said cavity and said terminal over said first, second and third frequency ranges.

14. In a resonant cavity having a cylindrical side wall and enclosing end walls, a signal coupling arrangement including input signal coupling means and output signal coupling means, at least one of said coupling means comprising a signal terminal disposed in one of said end walls, and a member having first and second portions at right angles to each other, said first portion slidably engaging said terminal and said second portion slidably engaging said one of said end walls, said first portion being spaced from said one of said end walls a predetermined amount to introduce a capacitive reactance to counteract the inductive reactance of said member to thereby substantially eliminate detuning of said cavity by said member, and means rotating said member to control the degree of signal coupling between said cavity and said terminal.

15. In a radial resonant cavity having a cylindrical side wall and enclosing end walls, a signal coupling arrangement comprising a terminal disposed perpendicular to one of said end walls, a first member in electrically coupled pivotable relation to said terminal disposed parallel to said one of said end walls, a second member disposed adjacent the end of said first member removed from said terminal and in an electrical shorting sliding relationship with said one of said end walls and said first member, and means to rotate said first and second members to control the degree of signal coupling between said cavity and said terminal.

16. In a radial resonant cavity, means disposed for movement along a line parallel to and spaced from the central axis of said cavity for tuning said cavity continuously through a given frequency range, shorting means disposed parallel to and spaced from said central axis, and means to move said shorting means eccentrically relative to said central axis to extend the frequency range through which said cavity can be continuously tuned to a frequency range outside said given frequency range and contiguous thereto.

References Cited in the file of this patent

UNITED STATES PATENTS

| | | |
|---|---|---|
| 2,456,422 | James | Dec. 14, 1948 |
| 2,758,287 | Jacobsen | Aug. 7, 1956 |
| 2,782,383 | Olive | Feb. 19, 1957 |
| 2,813,251 | Brown | Nov. 12, 1957 |
| 2,851,666 | Kach | Sept. 9, 1958 |
| 2,875,369 | Chambers | Feb. 24, 1959 |
| 2,899,647 | Willwacher | Aug. 11, 1959 |
| 2,913,684 | Downie | Nov. 17, 1959 |